Nov. 2, 1954 H. DEWHURST 2,693,128
PHOTOGRAPHY, VIEWING AND PROJECTION OF
PICTURES WITH STEREOSCOPIC EFFECT
Filed Oct. 21, 1948 5 Sheets-Sheet 1
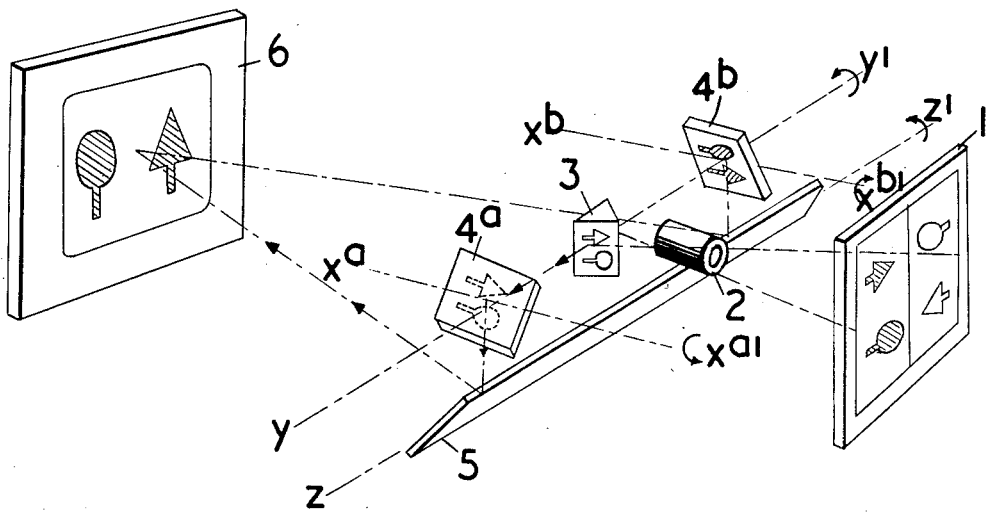
FIG.I.
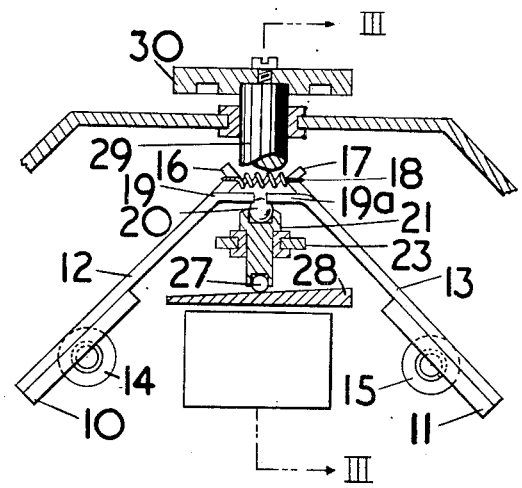
FIG.2.
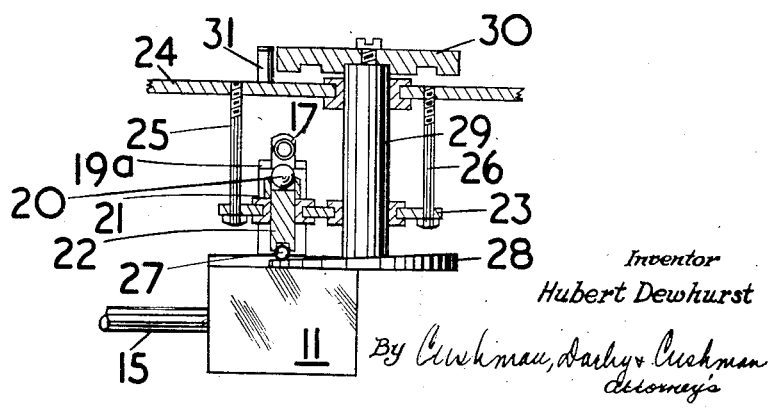
FIG.3.
Inventor
Hubert Dewhurst
By Cushman, Darby & Cushman
Attorneys Nov. 2, 1954　　　　　H. DEWHURST　　　　　2,693,128
PHOTOGRAPHY, VIEWING AND PROJECTION OF
PICTURES WITH STEREOSCOPIC EFFECT
Filed Oct. 21, 1948　　　　　　　　　　　　5 Sheets-Sheet 2

Inventor
Hubert Dewhurst

By Cushman, Darby & Cushman
attorneys

Nov. 2, 1954

H. DEWHURST 2,693,128

PHOTOGRAPHY, VIEWING AND PROJECTION OF
PICTURES WITH STEREOSCOPIC EFFECT

Filed Oct. 21, 1948

Inventor
Hubert Dewhurst

Nov. 2, 1954

H. DEWHURST 2,693,128

PHOTOGRAPHY, VIEWING AND PROJECTION OF
PICTURES WITH STEREOSCOPIC EFFECT

Filed Oct. 21, 1948

Inventor
Hubert Dewhurst

By Cushman, Darby & Cushman
Attorneys

United States Patent Office 2,693,128
Patented Nov. 2, 1954

2,693,128

PHOTOGRAPHY, VIEWING, AND PROJECTION OF PICTURES WITH STEREOSCOPIC EFFECT

Hubert Dewhurst, Great Malvern, England

Application October 21, 1948, Serial No. 55,718

Claims priority, application Great Britain October 27, 1947

4 Claims. (Cl. 88—16.6)

The present invention relates to the production, projection and viewing of stereoscopic pictures.

Methods of deriving separate left and right images for stereoscopic purposes, and the recording of these side by side on single frames by beam-splitting are known and these methods, especially in motion-picture techniques, have the great advantage of requiring no duplication of cameras, projectors and films. Freedom from synchronisation problems and uniform-processing facilities are also achieved whilst sound tracks can be recorded and played back at normal film speeds.

In a known beam-splitting principle, the acceptance angle of the camera lens is split to accept two beams of half this angle horizontally each half being aligned at infinity or "toed-in" at some nearer distance and producing at the focal plane two pictures side by side within the normal single framing. Similarly, in projection, the rays of light are reversed in the same way back through the same or a similar device.

In spite of the advantages associated with a beam splitting technique, this particular principle nevertheless suffers in its adaptations from disadvantages which exclude it from being considered in serious cinematograph practice. In the first place, the acceptance angle being unavoidably reduced by half for a given taking lens, the resulting picture on the screen is longer vertically than it is wide, being in effect, in the cinematograph example, the familiar cinematograph frame of proportions 3 vertically by 4 horizontally divided by a vertical middle line to give, by superimposition, a frame of 3 vertically, by only 2 horizontally. A further disadvantage, fundamental to such designs, accentuates this already horizontally narrow frame by loss of width due to the necessity of masking out vignetting at the dividing line and possible further loss of masked picture width if variations are made to the "toe-in" for "framing" or other purposes.

In projecting any stereoscopic pairs on a screen, the frame or "window" through which the resultant scene is apparently viewed can be permanently fixed in the plane of the screen by cutting or blacking of the vertical screen edges whilst resorting to parallel projection on to the screen of the beams producing the two images. In effect, the constituent pictures of the stereoscopic pair have had, at the screen, an overriding frame-masking imposed upon them which fixes the apparent plane of the window in the plane of the screen irrespective of the intended framing achieved in the camera at the time of taking. Otherwise, the desirable facility of being able to place at will the window through which the stereo picture will be apparently seen in a variable plane other than that of the screen, requires a variably displaced disposal on the screen as between the two pictures, of the vertical boundaries of the framing actually recorded in the camera on both sides of each constituent picture at the time of taking; or, alternatively, of those (narrower) boundaries of the two pictures subsequently imposed upon the pictures at the projection gate by the frame installed in the projector.

In the particular case where the stereoscopic effect is to depend upon this particular beam splitting method, which gives upright pictures, the boundaries of the framing formed on the outside edge of each of the constituent pair of side-by-side pictures in the camera is that imposed by the vertical sides of the "camera frame" opening fitted to the camera gate relative to the medial ray of each picture as determined by the toe-in of each half-beam, where a toe-in is adopted, and of the vertical line between the two pictures dividing the pair of pictures down the middle of the frame, which is, however, necessarily a vignette whose width is a function of the lens aperture and its distance from the beam splitting edge. This vignetted ill-defined dividing line constitutes the left hand boundary of one picture and the right hand boundary of the other, and since the apparent position of the eventual projected framing on the screen will depend upon the relative positions on the screen of the two projected left hand picture-boundaries and of the two right hand picture-boundaries as recorded with respect to the subject matter in the picture, and as one of each of these must be ill-defined due to the vignette, no satisfactorily locatable plane of the resulting window, due to predetermined framing recorded on the film within the camera gate by the camera frame at the time of taking is practicable. Neither is an overriding framing, imposable at the projector, an alternative practicability as the aperture of the projector lens is also a potential vignette-producing factor in any secondary masking adjunct which seeks to mask out the width of the existing picture-dividing vignette recorded on the film. To achieve effective framing therefore, the only effective course is to fix the window in the plane of the screen by cutting or blacking of the screen, which may be additional to that necessary to accommodate any difference in the planes of taking and viewing toe-in, to cut out the ill-defined vignetted edges, thus reducing, possibly still further, a picture width initially narrow as compared with the height.

In visual inspection of the pair of stereoscopic pictures in a "viewer" taken by this type of beam splitting device the same considerations apply. For most subjects, with such a device, a pair of "still" photographs would have been taken with a toe-in permanently fixed or set at, say, 12 ft. from the camera. In the corresponding viewer, to give viewing free from accommodation and parallax strains to the eyes, the images would be viewed at infinity with parallel beams (toe-in at infinity). As in the projection analogue, picture width is lost in any effective means incorporated in the viewer to re-align the toe-in back to infinity and may be additive to that lost in any case through the necessity of cutting out the vignette.

Another beam splitting principle is known, which produces on the cine film split images rotated optically through 90° and which thus lie with their horizontals vertical on a vertically running film. The above discussed disadvantages can be mitigated or overcome by means of the present invention in beam splitting systems of this latter type.

In the first place, the processed images are rotated back again through 90° in projection or viewing, through the same or a similar optical device, giving on the screen superimposed images in which the picture taken is now disposed in a horizontal frame, similar in shape and disposition to the accustomed standard cine-theatre frame, in which however the proportions are increased to 3 horizontally by 2 vertically. A "horizontal" or "landscape" framing is familiar, especially on the cinematograph screen, whilst the horizontal frame is in any case aesthetically more satisfying for most subjects. Furthermore the wider horizontal frame coincides more closely with the shape of the horopter and is therefore one more likely to assist the illusion of relief, and the wider this horizontal angle of view within limits the more convincing the stereoscopic effect is likely to be. Also, to some extent, the loss in the original horizontal angle of view of half, due to splitting the beam, has been partially made up horizontally by the substitution of a horizontal proportion of 3, compared with the original horizontal unsplit beam acceptance angle of 4. It can be completely made up, if it be used in combination with a standard wide-angle lens of but three quarters of the focal length of the normal focal length taking lens, a beam-split half acceptance taking angle equal to the normal being achieved, giving thereby a projected screen image of that normal horizontal angle of view which is associated with usual cinematograph projection.

Toe-in of camera or projector, to give a variable plane of the "window" of taking or viewing of the two pictures, is no longer implicit in this system in the beam-splitting function of the optical system. Instead, toe-in takes place at right angles to the picture-dividing beam-splitting axis and in effect slides the two pictures vertically past the sharply defined top or bottom edges of camera or projector-gate frames to produce the pairs of left and right handed horizontal frame edges which eventually on re-rotation in the projection or viewing case can produce the illusion of a window in a particular plane. Where the angle of toe-in at taking is the same as the angle of toe-in at subsequent projection or viewing this 90° rotation beam-splitting method can display the whole scene taken without any loss of width whatsoever, giving in fact precisely the view in depth that two human eyes would have seen of the actual scene through a real window of the same effective dimensions.

It is to be noted however that in applications of the 90° rotation beam-splitting system, whether in projection or viewing, a certain amount of the picture width taken can be lost unless the subsequent projection or viewing toe-in is made in effect the same (taking into account the ratio of the focal length of the objective or eyepiece to that of the camera lens) although the necessity for cutting out a vignette is no longer an additional consideration. In consequence, known applications of the system are limited to a fixed camera toe-in, subsequently associated with a fixed projection screen distance (with a given lens) or a fixed viewer toe-in (usually at infinity).

The present invention is concerned with means for overcoming such restrictions. There are two paramount considerations in the subsequent projection or viewing of the pictures, namely framing and parallax adjustments. In normal stereoscopic photography practice it is usual to place the "window" through which the view is apparently seen at a distance closer to the eyes than any conspicuous object within the scene. As an example a frequent choice of window distance could be 12 ft., at which the camera toe-in can be arbitrarily set when the present invention is employed or in known systems is, of necessity, made a permanent setting. The nearest object of conspicuous importance might be at say 18 ft. In subsequent projection, the first consideration would be the placing of the window. Two alternatives are possible. One is to place the apparent window in the plane of the viewing screen— the most obvious position, and probably the one most subconsciously suitable. For given conditions of screen size, distance and focal length of objective, all of which have to be considered in terms of each other and as compared with the similar camera conditions at the time of taking, it will be necessary in the first place to superimpose the two images of both the top and bottom edges of the projector mask at each side of the screen if vertical strips of uneven illumination are to be avoided. From considerations of utilising as much as possible of the taken picture, these superimposed window boundaries will usually be placed at the edges of the screen. If other conditions of satisfactory projection later subscribe, this can mean that the window would appear to be in the plane of the screen; or not, if they do not. This can arise from the fact that a certain amount of tolerance in the choice of the plane where the screen may be placed, is due to the dimensions of the projector mask being smaller than those of the camera; and if therefore the resultant viewing parallax is now adjusted, as it must be for strainless viewing, so that approximate superimposition is achieved of the two images of the nearest conspicuous object in the middle distance (in the example— at 18 ft., when taken) the framing recorded on the film at taking may or may not be obscured by the more closely disposed projector mask images. Superimposition of these camera window sides to avoid vertical strips of one image only at each side and a window of indeterminate position, together with the necessity of adjusting the resultant parallax of the projected images to allow for the toe-in conditions of projection, whilst avoiding eye-strain in terms of that toe-in adopted in the camera at the time of taking (in which scope for various taking toe-in distances is preferably catered for), calls for a nice definition, instantaneous ease and an infallible automaticity of toe-in at the projector which the present invention has for its object to provide.

One object of this invention, therefore, is to provide an apparatus for photographing, projecting or viewing pictures in stereoscopic relief including an optical system arranged to provide adjustment of the toe-in applied to the two optical beams corresponding to the two component stereoscopic views.

Another object of the invention is to provide a camera or projector for taking or displaying stereoscopic pictures in which means are provided for adjusting the toe-in applied to the two optical beams corresponding to the two component stereoscopic views automatically as the focussing of the camera or projector lens is focussed.

Yet another object of the invention is to provide a mechanism for adjusting the two halves of an optical system used for photographing, projecting or viewing pictures in stereoscopic relief in complementary fashion to adjust the toe-in applied to the two optical beams passing through the system.

A further object is to provide a viewing device for viewing stereoscopic pairs of pictures, having means for adjusting the toe-in of the two optical beams corresponding to the two component views of a stereoscopic pair of views.

Further objects of the invention will appear as the description proceeds.

The invention will be more clearly understood from the following description given in detail with reference to the accompanying drawings, in which:

Fig. 1 is a diagrammatic perspective representation of the basic optical system employed. Fig. 2 is a partial front view and Fig. 3 a partial side view, each of these figures being partly in section, of a mechanism which may be employed in carrying out the invention in one of its aspects.

Figure 4:
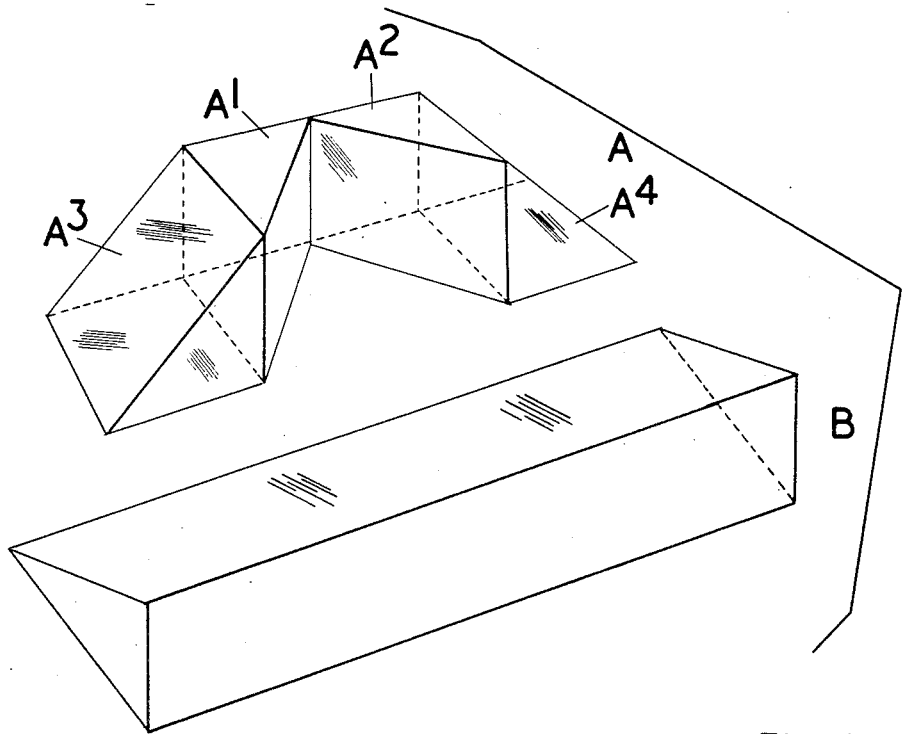
Fig. 4 is a perspective view of a practical form of optical system which may be employed in carrying out the invention in some of its forms.

Referring first to Fig. 1, this shows an optical system which may be employed in projecting stereoscopic pictures, it being understood that the same principles as are illustrated by this arrangement are applicable also in arrangements for photographing scenes or viewing pictures directly. The arrangement shown comprises a transparency 1 bearing two complementary views of a subject, a projection lens system 2, a mirror system 3, 4a, 4b, 5 and a screen 6. The two views of the transparency 1 appear sideways-up on the slide or film with their top edges abutting and each is rotated by the appropriate part of the mirror system through 90°, so that the two images appear right way up and superimposed upon the screen 6. Thus, considering only the right-hand view, designated in open lines, the half of the projection beam containing this view on emerging from the projection lens system 2 falls first upon the left-hand mirror surface of the beam splitting mirror wedge 3 from which it is directed onto the left-hand mirror 4a and thence downwardly onto the mirror 5 which directs it forwardly onto the screen 6. In order that the superimposition of the views on the screen 6 shall take place with the correct degree of overlap to produce the desired effect as discussed above the right-hand and left-hand beams require to be given the correct degree of toe-in and this may be effected in accordance with this invention in any one of three ways as follows:

(I) The angles of the mirrors 4a and 4b may be adjusted by rotation about the respective axes $Xa$, $Xa^1$ and $Xb$, $Xb^1$.

(II) The complete mirror system 3, 4a, 4b may be rotated about the axis $YY^1$ and the mirror 5 about the axis $ZZ^1$, the rotation of the mirror 5 being in the same sense as but through one half the angle that the mirror system 3, 4a, 4b is rotated or (III) The whole projection lens and mirror system may be raised or lowered with respect to the transparency 1.

In the first of the above methods the action of rotating, say, mirror 4a in the direction of the arrow shown in Figure 1 adjacent reference character $x^{a1}$ is to swing the downwardly directed beam from this mirror in the same direction and move the corresponding image towards the right. Rotation of mirror 4b in the direction of the arrow shown in Figure 1 adjacent reference character $x^{b1}$ shown has the reverse effect upon the other image. In other words the images are moved towards one another or the toe-in is increased. Obviously the rotations of the two mirrors may be coupled together so that the toe-in adjustment may be effected by equal movements of the two mirrors and the correct framing of the picture preserved.

In the second method, the effect of swinging the beam splitting mirror wedge 3 about the axis $YY^1$ in the sense indicated by the arrow is to swing the outwardly directed beams from the two sides of this mirror wedge upwardly which, it will be seen will have the effect of drawing the two images towards one another, the toe-in again being increased. The toe-in adjustment in this case, however, will be accompanied by an upward movement of the images on the screen 6 and this may be corrected by rotation of the mirror 5 in the direction indicated by the arrow as set out above. It can be demonstrated that the extent of the rotation required for mirror 5 is half that applied to the mirror system 3, 4a, 4b. Here again, the two movements concerned may be co-ordinated by means of a suitable mechanism.

Method III set out above relies on the fact that upward movement of the two images on the faces of the mirror wedge 3 is translated by the mirrors 4a and 4b into opposite transverse movements of the images towards one another on the mirror 5 and hence on the screen 6, toe-in thereby being increased. Thus, any simple mechanism for moving the transparency 1 up or down in relation to the projector lens and mirror system can be used to effect this adjustment.

In Figs. 2 and 3 there is shown one form of mechanism which may be used to carry out the method I above outlined. The drawings show only those parts of the complete structure concerned with the mirror adjustment. In these figures the two mirrors corresponding to mirrors 4a and 4b of Fig. 1 are shown at 10 and 11. The two mirrors are carried on carriers 12 and 13 which are pivoted at 14 and 15 for rotation about axes corresponding to the axes $Xa$, $Xa^1$ and $Xb$, $Xb^1$ of Fig. 1. The mirror carriers 12 and 13 comprise upwardly extending arms which terminate in hook ends 16 and 17 between which extends a tension spring 18 which tends to draw the two hook ends together and turn the mirrors into their positions of minimum toe-in.

Inwardly extending projections or lugs 19 and 19a on the arms 12 and 13 rest on a ball pivot 20 which is carried on, a ram comprising a cup 21 supported on a stem 22 which passes downwardly through a platform 23 which serves to guide the vertical movement of the ram. The platform 23 is supported from the top of the casing 24 by two rods 15, 16. The lower end of the stem 22 carries a ball 27 which rides on a cam disc 28 which when turned on the disc axis serves to raise or lower the assembly 19, 20, 21, 22, 27. To this and the cam disc 28 is carried on a shaft 29 journalled in the top of the casing 24, which carries an operating hand wheel or knurled knob 30. An index mark may be provided on a projection 31 on the casing top and the upper surface of the knob 30 graduated to indicate the toe-in in terms of the distance to which the set toe-in adjustment corresponds.

It will now be seen that as the knob 30 is turned the ball 19 will be raised or lowered and the ends of the arms 12 and 13 separated or allowed to move towards one another under the action of spring 18, thus turning the mirrors 10 and 11 each through the same angle but in opposite directions.

Fig. 4 shows in perspective an arrangement of reflecting prisms which may be used in place of the mirror arrangement shown in Fig. 1, and which constitutes an efficient and neat optical system for the purpose of the present invention which lends itself to application of the method II above referred to. This prism system comprises two parts A and B. The upper part, part A comprises in effect four prisms, which may be constructed as one integral prism or as two component halves or could, of course, be built up from four separate component prisms. The two centre prisms $A_1$ and $A_2$ perform the function of the beam-splitting mirror wedge 3 of Fig. 1, the two flanking prisms $A_3$ and $A_4$ constituting the downwardly reflecting mirrors corresponding to mirrors 4a and 4b of Fig. 1. The lower part, part B comprises one reflecting prism, common to the two light paths through the separate halves of part A and performs the function of the forwardly reflecting mirror 5 of Fig. 1. Obviously the prism B could be replaced by two further component parts of the composite prism A but for the application of method II above described it is preferable to make this part B as a separate prism as shown.

Figure 5:
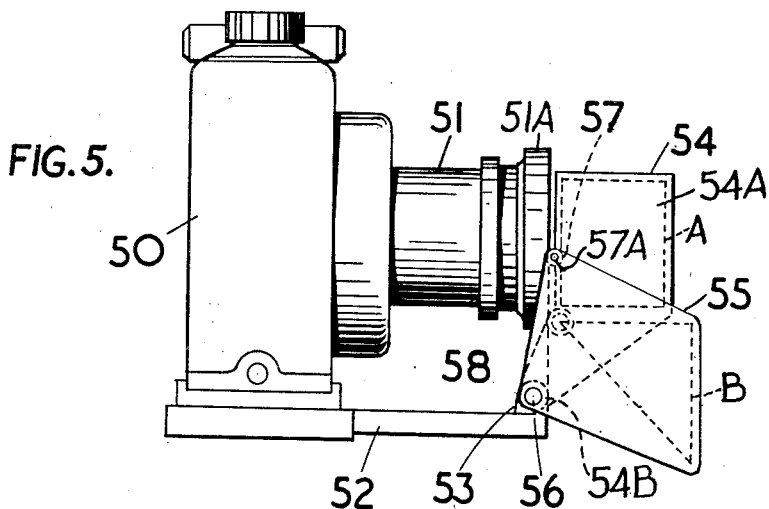
Fig. 5 is a diagrammatic representation of a mechanism which may be employed in carrying out the invention in one aspect thereof.

In order to carry out method II the optical system of Fig. 4 may be employed in a mechanical system such as that illustrated in Fig. 5. In this figure, a camera of the "miniature" type, 50 is shown having a lens mount 51 which is adjustable backwards and forwards to adjust the focus of the lens on the film. A bracket 52 attached to the camera projects forwardly and supports at its forward end an upwardly projecting portion 53 which lies directly below the forward end of the lens mount 51. Pivoted to the portion 53 are two cradles 54 and 55 one of which, 54, carries the upper prism structure corresponding to A of Fig. 4 and the other, 55, carrying the lower prism corresponding to B of Fig. 4.

Figure 5A:
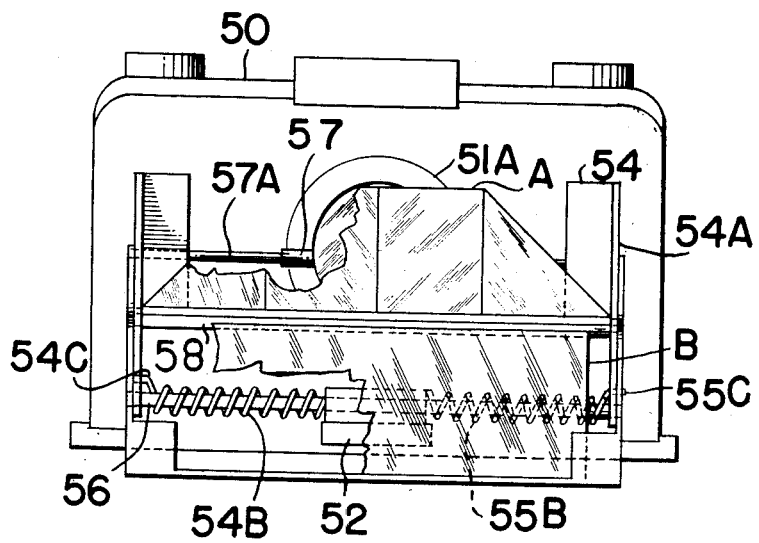
Fig. 5A is a front view of the mechanism of Fig. 5.

Fig. 5A shows a front elevation of the arrangement of Fig. 5 in which some parts have been cut-away in order to reveal details of the rollers 57 and 58 and of their cooperation with the lens mount 51. The roller 57 comprises a pair of bearing rollers one of which is shown attached to the cradle 55 by an extension member 57A; the second bearing roller and extension member are obscured in the drawing by the prism structure A. The roller 58 is shown extending between side cheeks 54A of the cradle 54. These rollers 57 and 58 bear against the front 51A of the lens mount 51. The cradle 54 is positioned shown in Fig. 5 to allow the roller 57 to be located between the cradle 54 and the front 51A of the lens mount 51.

A spring 54B is wound on the pivot 56 and serves to press the cradle 54 against the lens mount 51. One end 54C of this spring 54B acts upon the cradle 54 and is located in a hole in the side 54A. The other end of the spring 54B is attached to the bracket 52.

A further spring 55B wound on the pivot 56 serves to press the cradle 55 against the front 51A of the lens mount 51. One end 55C of this spring 55B is bent around side 55A of the cradle 55 and the other end is fastened to the bracket 52.

The two cradles 54 and 55 can swing about the pivot 56 on the portion 53 and are normally urged in an anti-clockwise direction by the springs 54B and 55B.

It will now be seen that, as the lens mount is advanced or retracted to focus the camera the cradles will be rocked forwards or backwards, the upper prism structure thus being turned through double the angle of the lower prism. By suitable choice of dimensions it can readily be arranged that the angular movements so produced are those required to produce the correct toe-in adjustment for toeing in the beam-splitting optical system, in the manner above described, on the object on which the camera is focussed. The toe-in adjustment thus becomes entirely automatic and is coupled to the focus adjustment which in turn may be coupled in known manner to the range finder adjustment. Obviously a similar system may be employed in connection with a projector.

The arrangements above described with reference to Figs. 2 to 5 are particularly suitable for application as attachments to cameras or projectors for still or moving pictures although it will be apparent that they could readily be applied to direct viewing devices. A further form which the invention may take will now be described with reference to Fig. 6 which shows in exploded perspective a suitable arrangement for viewing stereoscopic pairs produced, for example, with a miniature camera using one of the arrangements previously described. This viewing device conveniently employs the toe-in adjustment of method III above described and is used to illustrate the application of this method although it will be apparent that this form of toe-in adjustment according to the invention may also be used in cameras or projector in place of the forms of adjustment according to methods I and II.

Figure 6:
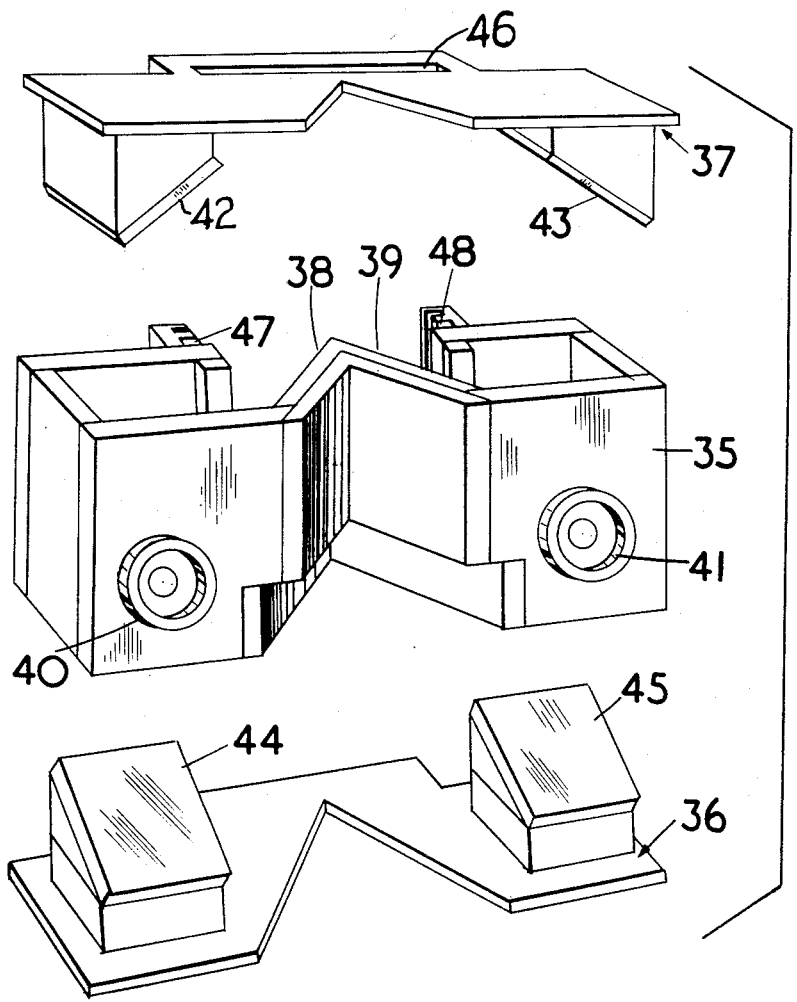
Fig. 6 is an exploded perspective representation of a further embodiment of the invention by way of example.

The viewer shown in Fig. 6 comprises three component sections, a body portion 35 a bottom portion 36 and a top portion 37. The form of the body portion 35 can be clearly seen from the drawing, from which it will be seen to comprise a beam-splitting mirror wedge 38, 39 and viewing eye pieces 40, 41. The downwardly reflecting mirrors, corresponding to the mirrors 4a and 4b of Fig. 1 are carried by the top portion 37 and are shown at 42, 43, the forwardly reflecting mirror 5 of Fig. 1 being replaced by two separate mirrors 44, 45 carrier by the bottom portion 36. These mirrors 44 and 45 will lie vertically below the mirrors 42, 43 and directly behind the eye pieces 40, 41 when the device is assembled. The transparency or other carrier for the stereoscopic pair of pictures is introduced through a slot 46 provided in the top portion 37 and is guided in grooves in the body portion 35, the upper ends of which can be seen at 47, 48 in the drawing. If a transparency is used illumination is provided therethrough from outside the device, and for this purpose a lamp box may be provided to which the device is attached. For viewing opaque pictures illumination must be provided for within the device.

Toe-in adjustment is provided for in this device, according to the invention by raising or lowering the picture carrier in the grooves 47, 48, and this process may be facilitated by providing a frame to hold the picture carrier, this frame being slidably mounted on the back of the viewer and adjustable thereon, for example, by means of a simple rack and pinion mechanism. Alternatively the picture carrier may be mounted on the lamp box where this is provided, and the viewer mounted for vertical movement on the lamp box by means of a similar rack and pinion mechanism. It should be noted in connection with this device that the V notch formed behind the beam-splitting mirror wedge provides space for the viewers nose so that the eyepieces may be brought close to the eyes. In this device, moreover, it has been assumed that the various mirrors are fixed, by means of suitable jigs, during the manufacture of the device, at the proper angles. Obviously, if desired or necessary, adjustments of these mirrors may be provided for in their mountings.

The particular applications described above of the optical principle, whereby the pictures of the scene taken are photographed on the film in a head-head (or tail-tail) relationship, may lead in the particular case of subsequent projection of pictures taken on a cine film to relative movements or "jitter" of the two superimposed half-pictures on the screen due to the sprocket holes of the film becoming worn; or due to any cause producing irregular movement of the pictures within the projection gate. This possible drawback, applicable only to the photography and subsequent projection of motion pictures, can be overcome if the attachments concerned take or reproduce the pictures, in a head-tail (or tail-head) relationship. Pictures so taken remain in effect locked in their relative positions, both when taken and subsequently projected, irrespective of movement of the film in the gate.

Figure 7:
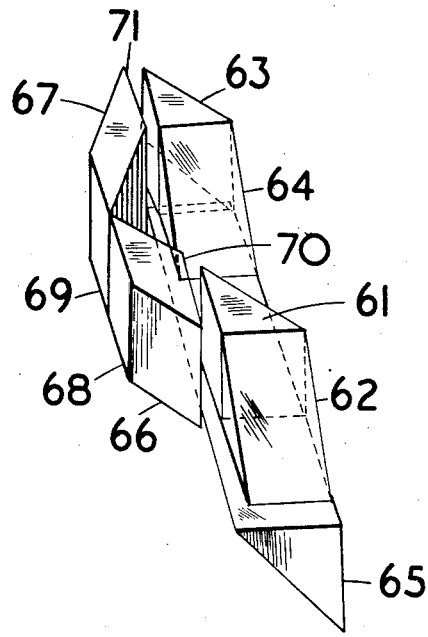
Fig. 7 is a perspective diagrammatic view of a form of optical system which may be employed in carrying out the invention in one of its forms and Fig. 8 is a similar view of an alternative optical system to that shown in Fig. 7.

An alternative optical system, particularly applicable to the cine camera, is shown in Fig. 7. Here the prism pair 61, 62, together with its operating portion of the base prism 65, is coupled to a similar combination of prisms 63, 64, 65 in the same sense. That is to say, each combination of the three prisms rotates its half image in the same direction. The spacing of the corresponding elements of the two prism assemblies is at the interocular distance, and to arrange for beam splitting whilst preserving this distance, two additional prisms, 66 and 67 are introduced. Each of these lozenge-shaped prisms is a pair of internally reflecting prisms and back-to-back, splitting the beam at faces 68 and 69 into the camera lens after acceptance of the beam at faces 70 and 71 opposite the two appropriate faces of the two three-prism combinations, spaced as described at the interocular distance. This combination of prisms can of course be used for projection or for photography.

Figure 8:
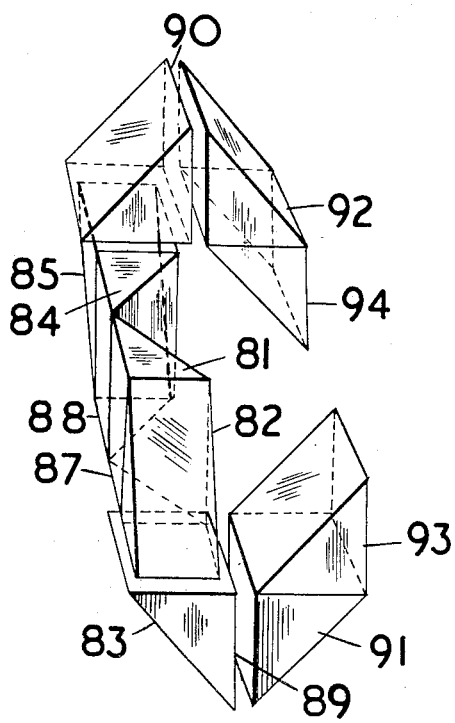

Another optical system producing the head-tail disposition of pictures is shown at Fig. 8. In this there are again two of the three-prism combinations common to all the optical systems employed in carrying out the invention. The combination 81, 82, 83 can be disposed as usual with effect to the camera lens, but the combination 84, 85, 86 is turned upside down as shown so that in effect the two prism combinations each rotates its half-picture in the same sense. As far as use with the camera is concerned however the scene receiving apertures 89 and 90, although at substantially the interocular distance, are unavoidably displaced vertically. Pictures taken with the device in this state would show false stereoscopic view points as compared with those seen by normal human eyes which are normally level. To correct this, two lozenge shaped prisms 91, and 92, similar to the lozenge-shaped prisms 70 and 71 of Fig. 7 are disposed in front of the scene receiving apertures 89 and 90 in the manner shown. The new receiving apertures 93 and 94 restore two view points to the device which, whilst being at the interocular distance, are now level. This device can be used without the lozenge prisms when projecting, as within limits it is not a requirement that the two exit apertures 89 and 90 should be level. This variant can be also arranged with the scene receiving apertures 89, 90, level in the first instance. The consequent difference in the level of the exit apertures 87 and 88 is then restored by lozenge prisms between these exit faces and the camera lens.

In both of the head-tail variants as above, mirrors may be substituted for prisms wholly or in part.

It will be observed that with the two optical systems last described the images are rotated in the same direction and appear on the film or other picture carrier the same way up. Movement of the optical system as a whole with respect to the pair of pictures will not therefore produce the movements in opposite directions of the images required for toe-in adjustment. With such systems, therefore, method I must be employed or a modified form of method II, in which the two halves of the optical system are turned in opposite directions instead of in the same direction.

In some of the optical systems described above by way of example mirrors are used as reflecting media while in others reflecting prisms have been selected. It will be understood, of course, that the choice of reflecting surface will depend in any given arrangement on the quality and style of manufacture desired in the apparatus to be produced and mirrors and reflecting prisms are regarded, for the purpose of this invention as optically equivalent.

Finally, it should be pointed out that in the appended claims the optical systems involved have been defined only with reference to the passage therethrough of a pair of images from a picture carrier. It will, of course, be understood that these optical systems are reversible and may be employed equally for photography or for projection.

Having now particularly described and ascertained the nature of my said invention, and in what manner the same is to be performed, I declare that what I claim is:

1. In apparatus for photographing, viewing or projecting stereoscopic pictures, optical means comprising; first means for establishing a major optical axis, second means for establishing two opposing minor axes in the same plane with the major axis, the minor axes being substantially perpendicular to the major axis, third means including means intercepting each minor axis for establishing therewith parallel optical axes coplanar with and substantially perpendicular to the minor axes, fourth means intercepting the parallel axes for establishing further optical axes substantially parallel to the major axis, the arrangement being such that images are rotated through 90° between the major axis and said further axes, means for mounting said first and second means on a first support for rotational movement about an axis parallel to said minor axes, means for mounting the third means on a second support also for rotational movement about an axis parallel to said minor axes, means for simultaneously rotating the first and second supports about said axes thereof, and means coacting with the rotating means for rotating said first support means through an angular displacement equal to twice the angular displacement through which the second support means is moved.

2. A stereoscopic attachment for cameras and projectors having an adjustably movable lens system, said attachment comprising optical means including first means for establishing a major optical axis, second means for establishing two opposing minor axes in the same plane with the major axis, the minor axes being substantially perpendicular to the major axis, third means including means intercepting each minor axis for establishing therewith parallel optical axes coplanar with and substantially perpendicular to the minor axes, fourth means intercepting the parallel axes for establishing further optical axes substantially parallel to the major axis, the arrangement being such that images are rotated through 90° between the major axis and said further axes, means for mounting said first and second means on a first support for rotational movement about an axis parallel to said minor axes, means for mounting the third means on a second support also for rotational movement about an axis parallel to said minor axes, means for simultaneously rotating the first and second supports about said axes thereof, and means coacting with the rotating means for rotating said first support means through an angular displacement equal to twice the angular displacement through which the second support means is moved, the last mentioned means including linkage means coacting with the adjustably movable lens system for interlocking the rotation of said first and second supports with the lens system.

3. Apparatus as in claim 1 wherein the means for establishing the major optical axis is a single lens.

4. Apparatus as in claim 2 wherein the means for establishing the major optical axis is a single lens.

References Cited in the file of this patent

UNITED STATES PATENTS

| Number | Name | Date |
|---|---|---|
| 2,282,947 | Sherbinin | May 12, 1942 |
| 2,313,561 | Mainardi et al. | Mar. 9, 1943 |
| 2,329,294 | Ramsdell | Sept. 14, 1943 |
| 2,403,733 | Mainardi et al. | July 9, 1946 |

FOREIGN PATENTS

| Number | Country | Date |
|---|---|---|
| 491,578 | Great Britain | Nov. 30, 1936 |